United States Patent
Kim et al.

(10) Patent No.: US 12,054,583 B2
(45) Date of Patent: Aug. 6, 2024

(54) METHOD FOR PREPARING GRANULAR POLYCARBONATE

(71) Applicant: LG Chem, Ltd., Seoul (KR)

(72) Inventors: Hyunju Kim, Daejeon (KR); Hyeon Hui Kim, Daejeon (KR); Jae Hoon Choe, Daejeon (KR); Mooho Hong, Daejeon (KR); Ki Jae Lee, Daejeon (KR); Soyeon Jee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 622 days.

(21) Appl. No.: 17/413,285

(22) PCT Filed: Jan. 16, 2020

(86) PCT No.: PCT/KR2020/000819
§ 371 (c)(1),
(2) Date: Jun. 11, 2021

(87) PCT Pub. No.: WO2020/149673
PCT Pub. Date: Jul. 23, 2020

(65) Prior Publication Data
US 2022/0025113 A1  Jan. 27, 2022

(30) Foreign Application Priority Data

Jan. 18, 2019 (KR) .................. 10-2019-0007087
Feb. 19, 2019 (KR) .................. 10-2019-0019348

(51) Int. Cl.
*C08J 3/12* (2006.01)
*C08G 64/40* (2006.01)
*C08J 3/09* (2006.01)

(52) U.S. Cl.
CPC ............ *C08G 64/406* (2013.01); *C08J 3/095* (2013.01); *C08J 3/096* (2013.01); *C08J 3/12* (2013.01); *C08J 2369/00* (2013.01)

(58) Field of Classification Search
USPC ....................................................... 528/492
See application file for complete search history.

(56) References Cited

U.S. PATENT DOCUMENTS

| | | | |
|---|---|---|---|
| 3,668,181 A * | 6/1972 | Oxenrider ............ | C08G 64/406 528/480 |
| 4,452,976 A | 6/1984 | Kohyama et al. | |
| 4,546,172 A | 10/1985 | Kohyama et al. | |
| 4,663,433 A | 5/1987 | Pyles et al. | |
| 4,668,768 A | 5/1987 | Mendiratta et al. | |
| 5,196,507 A | 3/1993 | Totani et al. | |
| 5,726,223 A | 3/1998 | Okamoto et al. | |
| 5,852,157 A | 12/1998 | Zaby et al. | |
| 6,410,676 B1 | 6/2002 | Yamasaki et al. | |
| 6,489,372 B1 | 12/2002 | He et al. | |
| 2011/0054145 A1 | 3/2011 | Chang et al. | |
| 2015/0024205 A1 | 1/2015 | Asano et al. | |
| 2016/0162665 A1 | 6/2016 | Lee et al. | |
| 2017/0275423 A1 | 9/2017 | Hwang et al. | |
| 2018/0244863 A1 | 8/2018 | Leenders | |
| 2019/0085120 A1 | 3/2019 | Hirata et al. | |

FOREIGN PATENT DOCUMENTS

| | | |
|---|---|---|
| EP | 0499072 A1 * | 8/1992 |
| EP | 0499072 A1 | 8/1992 |
| EP | 3165553 A1 | 5/2017 |
| EP | 3431524 A1 | 1/2019 |
| JP | H0532794 A | 2/1993 |
| JP | H06025429 A | 2/1994 |
| JP | H06200042 A | 7/1994 |
| JP | H07268092 A | 10/1995 |
| JP | H0816165 B2 | 2/1996 |
| JP | H09241389 A | 9/1997 |
| JP | 3137781 B2 | 2/2001 |
| JP | 2003518536 A | 6/2003 |
| JP | 2018525505 A | 9/2018 |
| KR | 960000571 B1 | 1/1996 |
| KR | 20010033401 A | 4/2001 |
| KR | 20040040663 A | 5/2004 |
| KR | 20040040664 A | 5/2004 |
| KR | 20110024847 A | 3/2011 |
| KR | 20120052008 A | 5/2012 |
| KR | 20140126325 A | 10/2014 |
| KR | 20140145884 A | 12/2014 |
| KR | 20150022155 A | 3/2015 |

(Continued)

OTHER PUBLICATIONS

KR20160052437A Machine Translation (Year: 2017).*
Extended European Search Report for corresponding European Patent Application No. 20741396 dated Jan. 10, 2022, 4 pgs.
Surface Tension, Hansen Solubility Parameters, Molar Volume, Enthalpy of Evaporation, and Molecular Weight of Selected Liquids Polar/Dispersion Acid-Base Hansen Parameters Name, Jun. 15, 2013, pp. 1-6.
Thomson Scientific, "Database WPI Week 199409", Feb. 1, 1994, London, GB AN 1994-072028, 2pgs.

(Continued)

*Primary Examiner* — Terressa Boykin
(74) *Attorney, Agent, or Firm* — Lerner David LLP (57) ABSTRACT

A method for preparing granular polycarbonate particles is disclosed herein. In some embodiments, a method for preparing granulated polycarbonate particles includes mixing a polymerization reaction solution comprising polycarbonate and an organic solvent, and an anti-solvent solution comprising water and an anti-solvent to prepare a mixed solution, heating the mixed solution to remove the organic solvent, and drying or filtering the mixed solution to obtain granular polycarbonate particles. The granular polycarbonate particles having excellent physical properties without using a stabilizer or a surfactant can be obtain.

11 Claims, 1 Drawing Sheet

(56) References Cited

FOREIGN PATENT DOCUMENTS

| KR | 20150060274 A | 6/2015 |
|---|---|---|
| KR | 20160052437 A | 5/2016 |
| KR | 20160069250 A | 6/2016 |
| KR | 101681019 B1 | 12/2016 |
| WO | 01048059 A1 | 7/2001 |
| WO | 2017159727 A1 | 9/2017 |

OTHER PUBLICATIONS

Thomson Scientific, "Database WPI Week 199433", Jul. 19, 1994, London, GB, AN 1994-269540, 2 pgs.
Andreas Klamt: Wires Computational Molecular Science: The COSMO and COSMO-RS solvation models; vol. 1, Sep. 2011, pp. 699-709.
Directory of Solvents: Year1996, pp. 22-29.
Industrial Solvents Handbook: Year 1996, pp. 35-68.
International Search Report for Application No. PCT/KR2020/000819, dated Apr. 20, 2020, 3 pages.

\* cited by examiner

METHOD FOR PREPARING GRANULAR POLYCARBONATE

CROSS REFERENCE WITH RELATED APPLICATION(S)

The present application is a national phase entry under 35 U.S.C. § 371 of International Application No. PCT/KR2020/000819, filed on Jan. 16, 2020, which claims priority from Korean Patent Application Nos. 10-2019-0007087, filed Jan. 18, 2019, and 10-2019-0019348, filed on Feb. 19, 2019, the disclosures of which are incorporated herein by reference.

BACKGROUND OF THE INVENTION

(a) Field of the Invention

The present disclosure relates to a method for preparing a granular polycarbonate.

(b) Description of the Related Art

Polycarbonate is one of engineering plastics and is a material widely used in the plastics industry. The polycarbonate is excellent in transparency, impact resistance, mechanical strength, heat resistance, and the like, and thus is applied in a wide range of fields such as transparent sheets, automobile bumpers, and optical disks.

These polycarbonates are usually prepared by a method of reacting a divalent aromatic hydroxy compound with phosgene, or by an exchange method of reacting a divalent aromatic hydroxy compound with a carbonic acid diester.

In the polycarbonate polymerization product prepared by the above methods, impurities exist in addition to the desired polycarbonate. For example, the impurities are organic solvents commonly used for preparing a polycarbonate, such as methylene chloride ($CH_2Cl_2$), a catalyst component such as triethylamine (TEA), and a salt component such as sodium chloride and sodium carbonate. Therefore, after the polymerization process of the polycarbonate, a series of purification processes for removing impurities existing in the polymer solution are performed.

The polycarbonate polymer that has undergone the purification process is shaped into a powder form, a flake form, a granule form, or the like while undergoing a solvent removal process, which is heat-extruded and finally made in a pellet form.

However, in the case of the powder form, there is a problem that it is scattered during work. In the case of the flake form, the weight relative to volume is remarkably small and so it is inefficient when producing alloy products with other polymers, so that it is usually processed into pellets for use. However, because it is exposed to high temperature heat for processing into pellets, there is a problem that the physical properties of the original polycarbonate are deteriorated.

In order to solve these problems, many studies have been conducted to prepare a polycarbonate having a granule form with a high bulk density similarly to a pellet during the solvent removal process without heat exposure.

As a conventional purification method, a method using an anti-solvent is disclosed in U.S. Pat. Nos. 5,196,507A, 5,726,223A and the like. The above patent documents disclose a method of obtaining polycarbonate particles from which the solvent is removed by using an anti-solvent that is mixed with a solvent but does not dissolve the polycarbonate. However, according to the method disclosed in the above documents, there is a problem that a large amount of anti-solvent must be used, and a stabilizer must be used to obtain spherical polycarbonate particles.

U.S. Pat. No. 4,546,172A discloses a method of obtaining polymer particles using only water without an anti-solvent. However, this method has problems that the process time is long and the size of the particles is not uniform, so it is necessary to go through an additional process.

In addition, there is known a method of producing polycarbonate particles by removing the solvent within a short time by a process such as spray drying or high-temperature steam spraying, but the polycarbonate particles obtained by the above method have a problem that they have many internal voids and thus, the bulk density of the particles is lowered.

PRIOR ART LITERATURE

Patent Literature (Patent Literature 0001) U.S. Pat. No. 5,196,507A
(Patent Literature 0002) U.S. Pat. No. 5,726,223A
(Patent Literature 0003) U.S. Pat. No. 4,546,172A

SUMMARY OF THE INVENTION

It is an object of the present disclosure to provide a method for preparing granular polycarbonate particles having excellent physical properties without using a stabilizer or a surfactant.

In order to achieve that above object, there is provided a method for preparing polycarbonate particles, comprising the steps of:

mixing a polymerization reaction solution containing polycarbonate and an organic solvent, and an anti-solvent solution containing water and an anti-solvent to prepare a mixed solution;

heating the mixed solution to remove the organic solvent; and drying or filtering the mixed solution to obtain granular polycarbonate particles, wherein the anti-solvent satisfies all of the following Equations 1 to 3.

$$11.8 < Ra < 14.1 \qquad \text{[Equation 1]}$$

in Equation 1, Ra is the Hansen Solubility Parameter (HSP) of an anti-solvent for polycarbonate;

$$-0.88 < \Delta\mu < 1.95 \qquad \text{[Equation 2]}$$

in Equation 2, $\Delta\mu$ is the mixing energy of an anti-solvent and polycarbonate;

$$\Delta\mu' < 4.0 \qquad \text{[Equation 3]}$$

in Equation 3, $\Delta\mu'$ is the mixing energy of the anti-solvent and water.

According to the present disclosure, even if a surfactant, a stabilizer, or a polycarbonate powder for nucleation is not used in the polymerization reaction solution after the polymerization step of polycarbonate, spherical granular polycarbonate particles having excellent physical properties in terms of bulk density and particle size range can be obtained.

In addition, according to the preparation method of the present disclosure, since the obtained granular polycarbonate is not exposed to high temperature, there is no fear of deterioration of the physical properties peculiar to the polycarbonate due to high temperature heat, and it has an appropriate particle size range and is not scattered into fine powders and thus has good fluidity, which is advantageous in a working environment.

DETAILED DESCRIPTION OF THE EMBODIMENTS

The terms used herein are used only to describe exemplary embodiments, and are not intended to limit the present disclosure. A singular expression includes a plural expression unless they have definitely opposite meanings in the context. It should be understood that the terms "comprise", "include", and "have" as used herein are intended to designate the presence of stated features, steps, constitutional elements, or combinations thereof, but it should be understood that they do not preclude a possibility of existence or addition of one or more other features, steps, constitutional elements, or combinations thereof.

Since the present disclosure may be modified in various forms and may have several embodiments, particular embodiments will be illustrated and described in detail below. However, it will be understood that the present disclosure is not limited to the particular embodiments but the invention includes all modifications, equivalents, and alternatives falling within the scope and sprit of the present disclosure.

Hereinafter, a method for preparing granular polycarbonate particles according to a specific embodiment of the present disclosure will be described in more detail.

According to an embodiment of the present disclosure, a method for preparing granular polycarbonate particles is provided, the method comprising the steps of: mixing a polymerization reaction solution containing polycarbonate and an organic solvent, and an anti-solvent solution containing water and an anti-solvent to prepare a mixed solution; heating the mixed solution to remove the organic solvent; and drying or filtering the mixed solution to obtain granular polycarbonate particles, wherein the anti-solvent satisfies all of the following Equations 1 to 3.

$$11.8 < Ra < 14.1 \quad \text{[Equation 1]}$$

in Equation 1, Ra is the Hansen Solubility Parameter (HSP) of an anti-solvent for polycarbonate;

$$-0.88 < \Delta\mu < 1.95 \quad \text{[Equation 2]}$$

in Equation 2, $\Delta\mu$ is the mixing energy of an anti-solvent and polycarbonate;

$$\Delta\mu' < 4.0 \quad \text{[Equation 3]}$$

in Equation 3, $\Delta\mu'$ is the mixing energy of the anti-solvent and water.

Specifically, the method for preparing the granular polycarbonate particles of the present disclosure will be described for each step.

First, a polymerization reaction solution containing polycarbonate and an organic solvent, and an anti-solvent solution containing water and an anti-solvent are mixed to prepare a mixed solution.

In the present disclosure, the polymerization method of the polycarbonate is not particularly limited, and can be directly prepared according to a known polymerization method of a general polycarbonate resin using a divalent hydroxy compound and a carbonate precursor as starting materials.

The divalent hydroxy compound and carbonate precursor are not particularly limited as long as they are used in the preparation of polycarbonate.

More specifically, the divalent hydroxy compound may include bisphenol A, 1,1-bis(4-hydroxyphenyl)ethane, bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, bis(4-hydroxyphenyl)diphenylmethane, α,ω-bis[3-(o-hydroxyphenyl)propyl]polydimethylsiloxane, or the like, and the compounds may be used alone or as a mixture of two or more thereof.

Further, the carbonate precursor may include dimethyl carbonate, diethyl carbonate, dibutyl carbonate, dicyclohexyl carbonate, diphenyl carbonate, ditolyl carbonate, bis(chlorophenyl)carbonate, di-m-cresyl carbonate, dinaphthyl carbonate, bis(diphenyl)carbonate, phosgene, triphosgene, diphosgene, bromophosgene, bishaloformate, and the like. These compounds may be used alone or as a mixture of two or more thereof.

As the polymerization method, an interfacial polymerization method may be used as an example. In this case, polymerization reaction can be carried out at normal pressure and low temperature, and allows easy molecular weight control. The interfacial polymerization is usually carried out in the presence of a salt component and an organic solvent.

The materials used for the interfacial polymerization are not particularly limited as long as they are materials that can be used for the polymerization of polycarbonate, and use amount of the materials can be adjusted as necessary.

The salt component may be, for example, an alkali metal hydroxide, such as sodium hydroxide or potassium hydroxide, or an amine compound such as pyridine.

The organic solvent is not particularly limited so long as it can be used in common polycarbonate polymerization. The organic solvent may be, for example, a halogenated hydrocarbon such as methylene chloride or chlorobenzene.

To facilitate the interfacial polymerization reaction, for example, a reaction accelerator such as a tertiary amine compound (such as triethylamine, tetra-n-butylammonium bromide, or tetra-n-butylphosphonium bromide, a quaternary ammonium compound, or a quaternary phosphonium compound, or the like may be further included in the interfacial polymerization.

Therefore, in the polycarbonate polymerization product prepared by the above methods, impurities exist as well as the desired polycarbonate, wherein the impurities are organic solvents such as methylene chloride (MC), a catalyst component such as triethylamine (TEA), and a salt component such as sodium chloride and sodium carbonate.

According to an embodiment of the present disclosure, before performing the step of removing the organic solvent, a step of removing the catalyst component and the salt component included in the polymerization reaction product may be further carried out. The step of removing the catalyst component and the salt component may be carried out by a conventional method used in the technical field to which the present disclosure belongs, and is not particularly limited. For example, a polymerization solution including polycarbonate and an organic solvent, and an impurity solution in which other components such as a catalyst and a salt component are dissolved may be respectively separated by a difference in density using a centrifugal separator.

In the specification of the present disclosure, the solution separated by removing and separating the catalyst component and the salt component from the polycarbonate polymerization product as described above and substantially containing only the polycarbonate resin and the organic solvent will be referred to as a "polymerization reaction solution".

In the polycarbonate polymerization reaction solution, a polycarbonate resin is typically present in an amount of about 5 to about 20% by weight and an organic solvent in an amount of about 80 to about 95% by weight based on the total weight of the polymerization reaction solution.

The present disclosure may be a granulation process in which a polycarbonate resin in the form of a solution is prepared into polycarbonate particles in a granule form by removing the organic solvent contained in the above-mentioned polycarbonate polymerization reaction solution.

The polycarbonate polymerization reaction solution as described above, and an anti-solvent solution containing water and an anti-solvent satisfying specific conditions are mixed to prepare a mixed solution.

In the conventional polycarbonate purification process, a method of using hexane, heptane, alcohol solvents such as, methanol, ethanol, propanol, or isopropanol, ketone solvents such as acetone and methyl ethyl ketone, ethyl acetate or the like as an anti-solvent is known. However, when using the anti-solvent as described above, a large amount of the anti-solvent must be used. In addition, there is a disadvantage in that a surfactant or a stabilizer must be added to granulate the polycarbonate, or a polycarbonate powder must be further added to aid in the nucleation and growth process.

The present disclosure has been completed focusing on the fact that when a mixed solvent of water and an anti-solvent satisfying the following Equations 1 to 3 is used, it is not necessary to add a surfactant, a stabilizer, or a polycarbonate powder for the granulation of polycarbonate, and granular polycarbonate particles with excellent physical properties can be obtained even with a small amount of anti-solvent.

$$11.8 < Ra < 14.1 \quad \text{[Equation 1]}$$

in Equation 1, Ra is the Hansen Solubility Parameter (HSP) of an anti-solvent for polycarbonate;

$$-0.88 < \Delta\mu < 1.95 \quad \text{[Equation 2]}$$

in Equation 2, $\Delta\mu$ is the mixing energy of an anti-solvent and polycarbonate;

$$\Delta\mu' < 4.0 \quad \text{[Equation 3]}$$

in Equation 3, $\Delta\mu'$ is the mixing energy of the anti-solvent and water.

First, in Equation 1, the Hansen solubility parameter was proposed by Charles Hansen as a kind of the method of predicting the solubility when one material is dissolved in another material to form a solution. For a more detailed description of the Hansen solubility parameter, see, for example, "INDUSTRIAL SOLVENTS HANDBOOK" (pp. 35-68, Marcel Dekker, Inc., published in 1996) or "DIRECTORY OF SOLVENTS" (pp. 22-29, Blackie Academic & Professional, published in 1996), etc.

Normally, in order to calculate the solubility parameter, the cohesive energy must be determined, but in the Hansen solubility parameter, the cohesive energy that affects the solubility constant is classified and determined into the following three types.

$\delta D$: solubility constant due to non-polar dispersion energy (unit: $(J/cm^3)^{1/2}$)

$\delta P$: solubility constant due to dipole polar energy (unit: $(J/cm^3)^{1/2}$)

$\delta H$: solubility constant due to hydrogen bonding energy (unit: $(J/cm^3)^{1/2}$)

The similarity of the solubility of the two materials can be calculated by determining the above parameters. For example, assuming that each Hansen solubility parameter value of two materials of polycarbonate (A) and anti-solvent (B) is ($\delta D_1$, $\delta P_1$, $\delta H_1$) for A, and ($\delta D_2$, $\delta P_2$, $\delta H_2$) for B, the Hansen solubility parameter (Ra) of the anti-solvent in polycarbonate can be calculated by the following Equation 4:

$$Ra = (4*(\delta D_1 - \delta D_2)^2 + (\delta P_1 - \delta P_2)^2 + (\delta H_1 - \delta H_2)^2)^{1/2} \quad \text{[Equation 4]}$$

In terms of solubility, it can be seen that the smaller the Ra value, the greater the similarity between the two materials, and the larger the Ra value, the lower the similarity between the two materials.

The Hansen solubility parameter of materials that can be used as polycarbonate and anti-solvent can be calculated according to the HSPiP (Hansen Solubility Parameters in Practice, $3^{rd}$ edition version 3.1 published by Hansen-Solubility.com) program developed by Dr. Hansen group.

On the other hand, it was confirmed that when a granular polycarbonate is prepared using diethyl ether as an anti-solvent, polycarbonate in powder form with very small particles, instead of granulated polycarbonate, is obtained, and when a granular polycarbonate is prepared using hexane as an anti-solvent, a phenomenon where too large particles of polycarbonate are formed and agglomerated is exhibited. Further, it was confirmed that the size of the polycarbonate particles is proportional to the Hansen solubility parameter (Ra) between the polycarbonate and the anti-solvent.

That is, when the anti-solvent is diethyl ether, the Hansen solubility parameter (Ra) with polycarbonate calculated by Equation 4 is 11.8, and when the anti-solvent is hexane, the Hansen solubility parameter (Ra) with polycarbonate calculated by Equation 4 is 14.1. However, it was experimentally confirmed that in the case of an anti-solvent having an Ra value of 11.8 or less, polycarbonate is obtained in the form of a powdered polycarbonate that has not been granulated, and in the case of the anti-solvent having an Ra value of 14.1 or more, reversely, the polycarbonate is agglomerated into a lump and does not have a particle shape.

For example, when ethyl acetate having the Ra value of 8.5, methyl ethyl ketone having the Ra value of 7.2, acetone having the Ra value of 8.5 or the like is used as an anti-solvent, only polycarbonate in powder form was obtained, and when ethanol having the Ra value of 15.7, methanol having the Ra value of 19.6, or water having the Ra value of 38.2 is used as an anti-solvent, polycarbonate is agglomerated into one lump, which is not suitable as an anti-solvent for obtaining granular polycarbonate.

Focusing on the relationship between these Hansen solubility parameters and the granulation of polycarbonate, in the preparation method of the present disclosure, one that satisfies Equation 1 (the condition where Ra is greater than 11.8 and less than 14.1) may be one condition of the anti-solvent.

Preferably, the Ra value of the anti-solvent may be 11.9 or more, or 12.0 or more, and 13.8 or less, or 13.5 or less, or 13.3 or less.

On the other hand, as the condition of the anti-solvent for forming granular polycarbonate, the anti-solvent satisfying the Equation 2 which affects not only the Hansen solubility parameter but also the mixed energy with the polycarbonate may be another condition.

$$-0.88 < \Delta\mu < 1.95 \quad \text{[Equation 2]}$$

in Equation 2, $\Delta\mu$ is the mixing energy of the anti-solvent and polycarbonate.

In Equation 2, $\Delta\mu$ is the mixing energy of the anti-solvent and polycarbonate, and means a chemical potential value when polycarbonate is mixed in a liquid phase in an anti-solvent. The mixed energy means a value calculated using the COSMO-RS theory, and for more information, see 2011 John Wiley & Sons, Ltd. WIREs ComputMol Sci 2011 1 699-709 DOI: 10.1002/wcms.56.

It can be seen that as the mixed energy value is smaller, the anti-solvent is more stably mixed in the solution with the polycarbonate.

It was confirmed that when a polycarbonate is prepared using diethyl ether as an anti-solvent similar to the Hansen solubility parameter, polycarbonate in powder form with very small particles, instead of granulated polycarbonate, is obtained, and when a granular polycarbonate is prepared using ethanol as an anti-solvent, the phenomenon that too large particles of polycarbonate are formed and agglomerated is exhibited. In addition, it was confirmed that the size of the polycarbonate particles is proportional to the mixing energy of the polycarbonate and the anti-solvent.

That is, when the anti-solvent is diethyl ether, the $\Delta\mu$ is −0.88, and when the anti-solvent is ethanol, the $\Delta\mu$ with polycarbonate is 1.95. However, it was experimentally confirmed that in the case of the anti-solvent having the $\Delta\mu$ of −0.88 or less, polycarbonate in the form of powder that has not been granulated is obtained, and in the case of the anti-solvent having the $\Delta\mu$ of 1.95 or more, reversely the polycarbonate was agglomerated into a lump and does not have a particle shape.

For example, ethyl acetate having the $\Delta\mu$ of −1.27, methyl ethyl ketone having the $\Delta\mu$ of −1.41, acetone having the $\Delta\mu$ of −1.73 or the like is used as an anti-solvent, only polycarbonate in powder form is obtained, and when hexane having the $\Delta\mu$ of 2.05, methanol having the $\Delta\mu$ of 2.61, or water having the $\Delta\mu$ of 16.23 is used as an anti-solvent, polycarbonate is agglomerated into one lump, which is not suitable as an anti-solvent for obtaining granular polycarbonate.

Focusing on the relationship between the difference in the mixed energy with polycarbonate and the granulation of polycarbonate, in the preparation method of the present disclosure, one that satisfies Equation 2 (the condition in which the difference ($\Delta\mu$) of the mixed energy with the polycarbonate is greater than −0.88 and less than 1.95) may be one condition of the anti-solvent.

Preferably, $\Delta\mu$ of the anti-solvent may be 0.1 or more, or 0.5 or more, or 1.0 or more, and 1.8 or less, or 1.7 or less, or 1.65 or less.

Finally, in the preparation method of the present disclosure, the anti-solvent is not used alone, but is mixed with water and used as an anti-solvent solution, so that it is required to stably form a mixed solution with water.

In order to stably form a mixed solution with water, the mixing energy with water must be low, and accordingly, one satisfying the following Equation 3 is another condition of the anti-solvent.

$$\Delta\mu' < 4.0 \quad \text{[Equation 3]}$$

in Equation 3, $\Delta\mu'$ is the mixing energy with water.

Preferably, $\Delta\mu'$ of the anti-solvent may be −2.5 or more, or −2.0 or more, or 0.1 or more, and 2.0 or less, or 1.5 or less, or 1.0 or less.

Anti-solvents satisfying Equations 1 to 3 are summarized in Table 1 below. According to an embodiment of the present disclosure, anti-solvents illustrated in Table 1 may be suitably used, but the present disclosure is not limited thereto.

TABLE 1

|  | Ra | $\Delta\mu$ | $\Delta\mu'$ |
|---|---|---|---|
| acetonitrile | 12.6 | 1.49 | 1.16 |
| (e)-2-butenenitrile | 11.87 | −0.26 | 1.50 |
| 2-hydroxy-2-methylpropanenitrile | 11.98 | 1.61 | 0.32 |
| 1-butanol | 12.79 | 1.72 | 0.62 |
| 2,2,2-trifluoroethanol | 13.61 | 1.44 | 0.24 |
| 2-butanol | 12.03 | 1.41 | 0.66 |
| 2-methyl-1-butanol | 11.81 | 1.56 | 0.78 |
| isobutanol | 13.95 | 1.61 | 0.70 |
| tert-butanol | 13.12 | 1.41 | 0.58 |
| 2-mercaptoethanol | 12.23 | 1.04 | 0.63 |
| o-methylhydroxylamine | 11.96 | 1.42 | −0.18 |
| 2-hydroxy-2-methylpropanenitrile | 11.98 | 1.61 | 0.32 |
| tert-butyl hydroperoxide | 11.82 | 0.95 | 0.57 |
| 2-aminopropanol | 12.66 | 1.73 | −0.20 |
| 1-amino-2-propanol | 12.04 | 1.35 | −0.32 |
| propionic acid | 12.38 | 1.20 | 0.16 |
| 2-2'-(methylimino)bis ethanol | 13.97 | 1.37 | 0.10 |
| 2-chloroethanol | 12.70 | 1.61 | 0.63 |
| 1,2-diaminoethane | 12.79 | 0.14 | −2.22 |
| 2-propen-1-ol | 13.17 | 1.28 | 0.56 |
| 4-methyl-2-pentanol | 12.02 | 1.54 | 0.86 |
| 2-(2-aminoethyl)aminoethanol | 11.92 | 1.66 | −0.62 |
| 1-hydroxy-2-propanone | 11.98 | 0.60 | 0.59 |
| pyruvic acid | 12.26 | 0.72 | 0.27 |
| n,n-bis(2-hydroxyethyl)ethylamine | 12.90 | 1.55 | 0.15 |
| 3-amino-1-propanol | 13.07 | 0.86 | −0.57 |
| 1,1,1-trifluoro-2-propanol | 12.20 | 0.89 | 0.48 |
| pinacolyl alcohol | 12.59 | 1.28 | 0.99 |
| propargylic acid | 11.90 | 0.28 | −0.60 |
| (e)-2-butenenitrile | 11.87 | −0.26 | 1.50 |
| dimethoxy dimethylsilane | 13.11 | −0.68 | 1.11 |
| 3-methoxy-1-butanol | 12.16 | 0.13 | 0.31 |
| ethyl hydroperoxide | 13.66 | 0.96 | 0.27 |
| n-ethyl-n-hydroxyethanamine | 13.08 | 1.23 | 0.78 |

When all of Equations 1 to 3 are satisfied as described above, it can be suitably used as an anti-solvent, but further considering economy, ease of handling and the like, according to an embodiment of the present disclosure, preferably, acetonitrile, 1-butanol, 2-propen-1-ol, 2-chloroethanol and the like may be used.

According to an embodiment of the present disclosure, the anti-solvent solution may be mixed in the same or less weight than the polymerization solution. More specifically, the weight ratio of the anti-solvent solution and the polymerization reaction solution (anti-solvent solution:polymerization reaction solution) may be 2:8 to 5:5, or 3:7 to 5:5, or 4:6 to 5:5. When the content of the anti-solvent solution is too small beyond the above-described range, a phenomenon where it is not granulated but agglomerated into one lump may occur. Conversely, when the content of the anti-solvent solution is too large, it may be powdered, and there may be a drawback that the production rate during actual production is lowered and it is uneconomical.

According to an embodiment of the present disclosure, the anti-solvent solution may contain 5% by weight or more, or 10% by weight or more, or 20% by weight or more, or 25% by weight or more, or 30% by weight or more and 40% by weight or less, or 38% by weight or less, or 35% by weight or less of the anti-solvent, based on the weight of the total anti-solvent solution (water+anti-solvent). When the content of the anti-solvent is too small, the phenomenon where amorphous particles (particles with a major axis of 150 mm or more of polycarbonate particles) may be produced or agglomerated into a lump may occur. Conversely, when the content of the anti-solvent is too large, granules are not formed and it can be produced in the form of powder. From this point of view, it is desirable to have the above weight range.

Further, according to an embodiment of the present disclosure, the anti-solvent may be contained in an amount of 50 to 250 parts by weight, preferably 90 to 200 parts by weight based on 100 parts by weight of polycarbonate contained in the polycarbonate polymerization reaction solution. When the content of the anti-solvent is less than 50 parts by weight which is small, a phenomenon where amorphous particles is produced or agglomerated into a lump may occur. Conversely, when the content of the anti-solvent exceeds 250 parts by weight and is too large, the granules are not formed and can be prepared in a powder form. From this point of view, it is desirable to have the above weight range.

In one embodiment of the present disclosure, the anti-solvent solution consists only of water and an anti-solvent, and does not contain other anti-solvents in addition to the anti-solvent satisfying the above-mentioned conditions as the anti-solvent.

A method of adding a surfactant, a stabilizer or additional polycarbonate powder for granulating polycarbonate has been conventionally used, but when granules are prepared by adding a surfactant or a stabilizer, these added materials must be completely removed, which makes the process cumbersome. When these materials are not completely removed, there is a problem that the physical properties of the polycarbonate, especially transparency, are deteriorated.

In addition, when polycarbonate powder is added for nucleation, a powder charging process is added, which is not desirable in terms of process economy. The powder has poor fluidity and it is difficult to construct a transfer system.

On the other hand, in one embodiment of the present disclosure, no surfactants, stabilizers or additional polycarbonate powders are added for granulation of polycarbonate, it is possible to prevent the above-mentioned problems that may be caused by further adding them.

The method of mixing the polycarbonate polymerization reaction solution and the anti-solvent solution is not particularly limited, and any method such as a method of first adding the polycarbonate polymerization reaction solution to a container and adding an anti-solvent solution, or a method of adding the polycarbonate polymerization reaction solution and an anti-solvent solution at the same time can be used.

In addition, the mixing temperature is not particularly limited, and may be carried out in the range of room temperature (25±2° C.).

Next, the mixed solution is heated to remove the organic solvent.

The heating may be carried out so that the temperature of the mixed solution is 40 to 70° C., or 40 to 60° C. When the heating temperature is less than 40° C. which is too low, the removal of the organic solvent may not be sufficient, and when the heating temperature exceeds 70° C. and is too high, many voids may be generated inside granules or the size of the voids may increase, which may cause a decrease in bulk density. Therefore, the range of the heating temperature is preferably the above-described range.

Further, the heating may be carried out for 30 to 250 minutes, or 30 to 200 minutes. When the heating time s less than 30 minutes and is too short, the removal of the organic solvent may not be sufficient, and when the heating time exceeds 250 minutes and is too long, a large amount of fine powders may be generated, which may be disadvantageous in terms of production volume and economy during production.

Further, the heating may be carried out by a method such as a water bath, a jacket, a heating band, and a coil jacket, but the present disclosure is not limited thereto.

According to an embodiment of the present disclosure, during heating, it may be desirable to heat the mixed solution while stirring at a constant speed, for example, at a speed of 80 to 900 rpm, or 100 to 800 rpm.

By the heating process, the organic solvent contained in the polycarbonate polymerization reaction solution may be removed in an amount of 80% by weight or more, or 84% by weight or more, and about 90% by weight or less, or about 88% by weight or less based on the initial 100% by weight content. When the removal weight of the organic solvent is less than 80%, granules do not form and polycarbonate that are agglomerated into a lump or are sticky is obtained. When the organic solvent is removed excessively to exceed 90%, the generated granules collide with each other and break, creating a large amount of fine powders. Therefore, the step of removing the organic solvent by the heating may be carried out to an extent that the organic solvent is removed up to 80 to 90%.

The remaining organic solvent may be removed by filtration or drying in a subsequent step.

Next, the mixed solution in which 80% by weight or more of the organic solvent is removed is dried or filtered to remove the remaining water and the anti-solvent, thus obtaining a granular polycarbonate.

The drying may be carried out so that the temperature of the mixed solution is 80 to 150° C., or 100 to 150° C. If the drying temperature is too low below 80° C., the organic solvent and anti-solvent may not be completely removed, and when the drying temperature is too high above 150° C., a change in physical properties may occur near the glass transition temperature of the polycarbonate, and thus, the range of the drying temperature is preferably the above-described range.

Meanwhile, in the case of the drying time, the process may be carried out for about 60 to about 600 minutes in consideration of process efficiency, but is not limited thereto.

Further, the drying method may be selected and used without limitation of its configuration as long as it is usually used as a drying process.

Further, the filtration method can be selected and used without limitation in its configuration as long as it is normally used.

The granular polycarbonate can be obtained by the above-mentioned method, and the obtained granular polycarbonate may have a bulk density of 0.40 to 0.70 g/cm$^3$ as measured by the test method of ASTM D1895.

More specifically, the granular polycarbonate may have a bulk density of 0.40 g/cm$^3$ or more, or 0.42 g/cm$^3$ or more, or 0.45 g/cm$^3$ or more, or 0.50 g/cm$^3$ or more, as measured by the test method of ASTM D1895.

The granular polycarbonate obtained by the preparation method of the present disclosure as described above is excellent in productivity due to its high bulk density. When compounding with other polymers to make a polymer alloy, it can exhibit excellent compatibility.

The upper limit of the bulk density is not particularly limited, but may be, for example, 0.70 g/cm$^3$ or less, or 0.65 g/cm$^3$ or less, or 0.62 g/cm$^3$ or less, or 0.60 g/cm$^3$ or less.

Further, the average particle size of the granular polycarbonate may be 0.3 to 10 mm.

More specifically, the average particle size of the granular polycarbonate may be 0.3 mm or more, or 0.5 mm or more, or 0.7 mm or more, and 10 mm or less, or 8 mm or less, or 7 mm or less, or 6 mm or less.

The average particle size of the granular polycarbonate may be measured by a method of selecting 20 granular particles from each of 10 randomly selected sections using SEM images, and measuring the length of the major axis of the selected granule particles to obtain the average value thereof, or a method of measuring the length of the major axis of more than 5000 granule particles through the image j program to obtain the average value thereof.

Further, the standard deviation of the particle size of the granular polycarbonate is 0.26 mm or less, or 0.25 mm or less, or 0.24 mm or less, or 0.23 mm or less, or 0.20 mm or less, or 0.18 mm or less, which may show a very uniform particle size distribution. The lower limit of the standard deviation is not particularly limited as it is better as it is lower, but it can be 0.01 mm or more, 0.03 mm or more, or 0.1 mm or more.

Further, the resulting granular polycarbonate may be substantially spherical.

Further, the granular polycarbonate can have a residual amount of methylene chloride of 50 ppm or less, 30 ppm or less, or 10 ppm or less, and can be in a state in which substantially all methylene chloride is removed.

According to the method for preparing the granular polycarbonate of the present disclosure as described above, the organic solvent present in the polymerization reaction product can be effectively removed, and spherical granular polycarbonate particles having excellent physical properties in terms of bulk density and particle size range can be obtained.

Hereinafter, preferred examples of the present disclosure will be described in detail. However, these examples are for illustrative purposes only, and may not be construed as limiting the scope of the present disclosure by these examples.

EXAMPLE

Example 1

Bisphenol A and phosgene were used as starting materials, and methylene chloride was used as a solvent, and polymerization was carried out by a polycarbonate polymerization process by conventional interfacial polymerization. The polymerization reaction product was centrifuged to prepare a polymerization reaction solution containing polycarbonate and methylene chloride (the polymerization reaction solution contains 17 wt % of polycarbonate and 83 wt % of methylene chloride).

3,500 g of the polymerization reaction solution and 3,500 g of an anti-solvent solution of water and 1-butanol (90 wt % water and 10 wt % 1-butanol) were mixed at room temperature, and the mixture was stirred at a temperature of 50° C. for 50 minutes at a rate of 1.5 to 3 m/s. Thereby, methylene chloride was removed up to 85 wt %.

Next, the polycarbonate was dried in an oven set to a temperature of 100° C. for 120 minutes to obtain a granular polycarbonate.

Example 2

The granular polycarbonate was obtained in the same manner as in Example 1, except that an anti-solvent solution containing 80 wt % of water and 20 wt % of 1-butanol was used as the anti-solvent solution In Example 1.

Example 3

The granular polycarbonate was obtained in the same manner as in Example 1, except that an anti-solvent solution containing 70 wt % of water and 30 wt % of 1-butanol was used as the anti-solvent solution in Example 1.

Example 4

The same polycarbonate polymerization reaction solution as in Example 1 was prepared.

4,200 g of the polymerization reaction solution and 2,800 g of an anti-solvent solution of water and 1-butanol (80 wt % water and 20 wt % 1-butanol) were mixed at room temperature, and the mixture was stirred at a temperature of 50° C. for 50 minutes at a rate of 1.5 to 3 m/s. Thereby, methylene chloride was removed up to 85 wt %.

Subsequent procedures were carried out in the same manner as in Example 1 to obtain a granular polycarbonate.

Example 5

The same polycarbonate polymerization reaction solution as in Example 1 was prepared.

4,900 g of the polymerization reaction solution and 2,100 g of an anti-solvent solution of water and 1-butanol (80 wt % water and 20 wt % 1-butanol) were mixed at room temperature, and the mixture was stirred at a temperature of 50° C. for 50 minutes at a rate of 1.5 to 3 m/s. Thereby, methylene chloride was removed up to 85 wt %.

Subsequent procedures were carried out in the same manner as in Example 1 to obtain a granular polycarbonate.

Example 6

The same polycarbonate polymerization reaction solution as in Example 1 was prepared.

3,500 g of the polymerization reaction solution and 3,500 g of an anti-solvent solution of water and 2-propen-1-ol (80 wt % water and 20 wt % 2-propen-1-ol) were mixed at room temperature, and the mixture was stirred at a temperature of 50° C. for 50 minutes at a rate of 1.5 to 3 m/s. Thereby, methylene chloride was removed up to 85 wt %.

Subsequent procedures were carried out in the same manner as in Example 1 to obtain a granular polycarbonate.

Example 7

The same polycarbonate polymerization reaction solution as in Example 1 was prepared.

3,500 g of the polymerization reaction solution and 3,500 g of an anti-solvent solution of water and 2-propen-1-ol (60 wt % water and 40 wt % 2-propene-1-ol) were mixed at room temperature, and the mixture was stirred at a temperature of 50° C. for 50 minutes at a rate of 1.5 to 3 m/s. Thereby, methylene chloride was removed up to 85 wt %.

Subsequent procedures were carried out in the same manner as in Example 1 to obtain a granular polycarbonate.

Example 8

The same polycarbonate polymerization reaction solution as in Example 1 was prepared.

3,500 g of the polymerization reaction solution and 3,500 g of an anti-solvent solution of water and 2-chloroethanol (80 wt % water and 20 wt % 2-chloroethanol) were mixed at room temperature, and the mixture was stirred at a temperature of 50° C. for 50 minutes at a rate of 1.5 to 3 m/s. Thereby, methylene chloride was removed up to 85 wt %.

Subsequent procedures were carried out in the same manner as in Example 1 to obtain a granular polycarbonate.

Example 9

The same polycarbonate polymerization reaction solution as in Example 1 was prepared.

3,500 g of the polymerization reaction solution and 3,500 g of an anti-solvent solution of water and acetonitrile (80 wt % water and 20 wt % acetonitrile) were mixed at room temperature, and the mixture was stirred at a temperature of 50° C. for 50 minutes at a rate of 1.5 to 3 m/s. Thereby, methylene chloride was removed up to 85 wt %.

Subsequent procedures were carried out in the same manner as in Example 1 to obtain a granular polycarbonate.

Example 10

The same polycarbonate polymerization reaction solution as in Example 1 was prepared.

4,200 g of the polymerization reaction solution and 2,800 g of an anti-solvent solution of water and acetonitrile (75 wt % water and 25 wt % acetonitrile) were mixed at room temperature, and the mixture was stirred at a temperature of 50° C. for 60 minutes at a rate of 1.5 to 3 m/s. Thereby, methylene chloride was removed up to 85 wt %.

Subsequent procedures were carried out in the same manner as in Example 1 to obtain a granular polycarbonate.

Example 11

The same polycarbonate polymerization reaction solution as in Example 1 was prepared.

4,200 g of the polymerization reaction solution and 2,800 g of an anti-solvent solution of water and acetonitrile (67.5 wt % water and 32.5 wt % acetonitrile) were mixed at room temperature, and the mixture was stirred at a temperature of 50° C. for 60 minutes at a rate of 1.5 to 3 m/s. Thereby, methylene chloride was removed up to 85 wt %.

Subsequent procedures were carried out in the same manner as in Example 1 to obtain a granular polycarbonate.

Example 12

The same polycarbonate polymerization reaction solution as in Example 1 was prepared.

3,500 g of the polymerization reaction solution and 3,500 g of an anti-solvent solution of water and acetonitrile (70 wt % water and 30 wt % acetonitrile) were mixed at room temperature, and the mixture was stirred at a temperature of 50° C. for 50 minutes at a rate of 1.5 to 3 m/s. Thereby, methylene chloride was removed up to 85 wt %.

Subsequent procedures were carried out in the same manner as in Example 1 to obtain a granular polycarbonate.

Comparative Example 1

Polycarbonate particles were obtained in the same manner as in Example 1, except that a solution containing 70 wt % of water and 30 wt % of ethyl acetate was used as an anti-solvent solution in Example 1.

Comparative Example 2

Polycarbonate particles were obtained in the same manner as in Example 1, except that a solution containing 70 wt % of water and 30 wt % of acetone was used as an anti-solvent solution in Example 1.

Comparative Example 3

Polycarbonate was obtained in the same manner as in Example 1, except that a solution containing 70 wt % of water and 30 wt % of hexane was used as an anti-solvent solution in Example 1. The obtained polycarbonate was agglomerated into one lump and did not have a particle shape.

Comparative Example 4

Polycarbonate was obtained in the same manner as in Example 1, except that a solution containing 100 wt % of water was used as an anti-solvent solution in Example 1. The obtained polycarbonate was agglomerated into one lump and did not have a particle shape.

Experimental Example

The physical properties of the polycarbonate particles obtained from the Examples and Comparative Examples were evaluated by the following method, and the results are shown in Table 2 below.

(1) Average particle size: 20 granular polycarbonates were randomly selected for each of 10 random sections in the SEM image (30 times magnification), and the length of the major axis of the selected granule polycarbonate was measured to calculate the average value.

Figure 1:
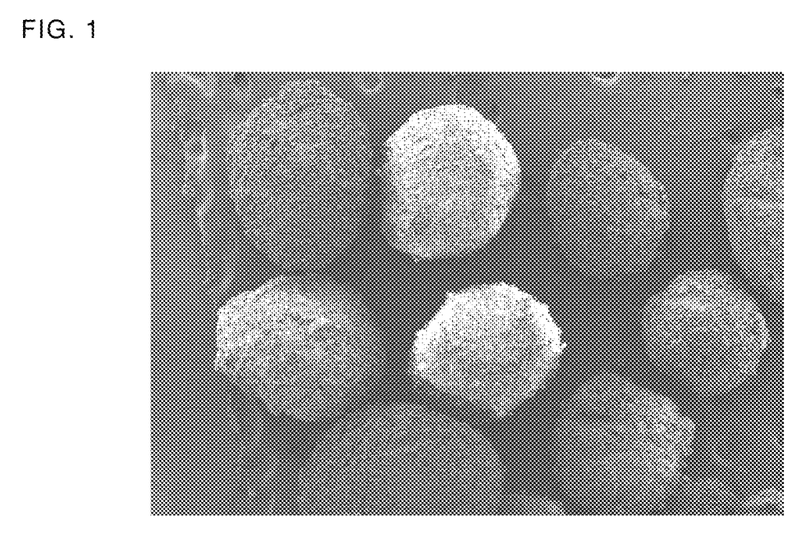
FIG. 1 is an SEM photograph of a polycarbonate granule obtained according to an embodiment of the present disclosure.
Figure 2:
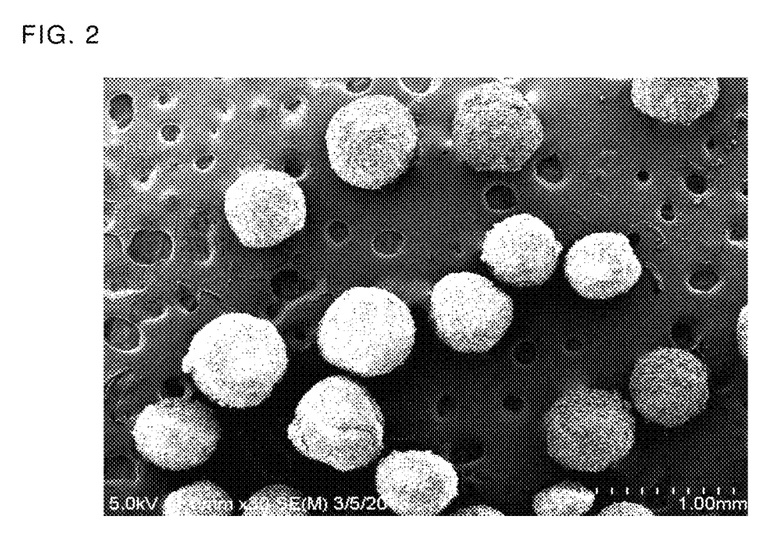
FIG. 2 is an SEM photograph of a polycarbonate granule obtained according to another embodiment of the present disclosure.

In addition, the SEM image of Example 1 is shown in FIG. 1 and the SEM image of Example 12 is shown in FIG. 2.

(2) Bulk density: It was measured by the test method of ASTM D1895.

(3) Standard deviation and coefficient of variation (CV)

For the granular polycarbonate of each Example and Comparative Example, the particle diameter was measured for 5,000 particles using the image J program to calculate the standard deviation and coefficient of variation.

TABLE 2

|  | Average particle size (unit: mm) | Bulk density (unit: g/cm$^3$) | Standard deviation (unit: mm) | coefficient of variation |
| --- | --- | --- | --- | --- |
| Example 1 | 5.88 | 0.62 | 0.152 | 0.258 |
| Example 2 | 5.21 | 0.58 | 0.23 | 0.441 |
| Example 3 | 4.45 | 0.57 | 0.192 | 0.431 |
| Example 4 | 4.38 | 0.55 | 0.168 | 0.383 |
| Example 5 | 4.26 | 0.60 | 0.26 | 0.591 |

TABLE 2-continued

| | Average particle size (unit: mm) | Bulk density (unit: g/cm³) | Standard deviation (unit: mm) | coefficient of variation |
|---|---|---|---|---|
| Example 6 | 4.57 | 0.51 | 0.238 | 0.521 |
| Example 7 | 4.13 | 0.46 | 0.21 | 0.508 |
| Example 8 | 3.24 | 0.45 | 0.132 | 0.407 |
| Example 9 | 4.45 | 0.62 | 0.18 | 0.404 |
| Example 10 | 5.21 | 0.58 | 0.23 | 0.441 |
| Example 11 | 2.38 | 0.57 | 0.105 | 0.441 |
| Example 12 | 0.78 | 0.43 | 0.045 | 0.577 |
| Comparative Example 1 | Fine powder of 0.2 mm or less | Not measurable | Not measurable | Not measurable |
| Comparative Example 2 | Fine powder of 0.2 mm or less | Not measurable | Not measurable | Not measurable |
| Comparative Example 3 | Not measurable | Not measurable | Not measurable | Not measurable |
| Comparative Example 4 | Not measurable | Not measurable | Not measurable | Not measurable |

Referring to Table 2, in the case of Examples 1 to 12 in which an organic solvent was removed using an anti-solvent solution containing water and an anti-solvent of the present disclosure and a drying process was performed according to the preparation method of the present disclosure, a spherical granular polycarbonate was obtained, and an excellent bulk density of 0.43 g/cm³ or more and a standard deviation of particle size of 0.26 mm or less was exhibited. However, in the case of Comparative Examples 1 to 4 in which only the conventional solvent or water was used as the anti-solvent solution, granular polycarbonate particles could not be obtained.

What is claimed is:

1. A method for preparing granulated polycarbonate particles, comprising:
    mixing a polymerization reaction solution comprising polycarbonate and an organic solvent, and an anti-solvent solution consisting of water and an anti-solvent to prepare a mixed solution;
    heating the mixed solution to remove the organic solvent; and
    drying or filtering the mixed solution to obtain granular polycarbonate particles,
    wherein the anti-solvent satisfies all of the following Equations 1 to 3, $$11.8 < Ra < 14.1 \qquad \text{[Equation 1]}$$

in Equation 1, Ra is a Hansen Solubility Parameter (HSP) of an anti-solvent for polycarbonate;

$$-0.88 < \Delta\mu < 1.95 \qquad \text{[Equation 2]}$$

in Equation 2, $\Delta\mu$ is a mixing energy of an anti-solvent and polycarbonate;

$$\Delta\mu' < 4.0 \qquad \text{[Equation 3]}$$

in Equation 3, $\Delta\mu'$ is a mixing energy of the anti-solvent and water,
wherein the anti-solvent comprises one or more of acetonitrile, (e)-2-butenenitrile, 2-hydroxy-2-methylpropanenitrile, 2,2,2-trifluoroethanol, 2-methyl-1-butanol, 2-mercaptoethanol, o-methylhydroxylamine, 2-hydroxy-2-methylpropanenitrile, tert-butyl hydroperoxide, 2-aminopropanol, 1-amino-2-propanol, propionic acid, 2-2'-(methylimino)bis ethanol, 2-chloroethanol, 1,2-diaminoethane, 2-propen-1-ol, 4-methyl-2-pentanol, 2-(2-aminoethyl)aminoethanol, 1-hydroxy-2-propanone, pyruvic acid, n,n-bis(2-hydroxyethyl)ethylamine, 3-amino-1-propanol, 1,1,1-trifluoro-2-propanol, pinacolyl alcohol, propargylic acid), dimethoxy dimethylsilane, 3-methoxy-1-butanol, ethyl hydroperoxide, and n-ethyl-n-hydroxyethanamine.

2. The method according to claim 1, wherein the anti-solvent is acetonitrile, 2-propen-1-ol, or 2-chloroethanol.

3. The method according to claim 1, wherein the anti-solvent solution and the polymerization reaction solution are mixed in a weight ratio of 2:8 to 5:5.

4. The method according to claim 1, wherein the anti-solvent solution includes 5 to 40% by weight of the anti-solvent based on the total weight of the anti-solvent solution.

5. The method according to claim 1, wherein the organic solvent includes methylene chloride.

6. The method according to claim 1, wherein the mixed solution is heated to a temperature ranging from 40° C. to 70° C.

7. The method according to claim 1, wherein the mixed solution is dried at a temperature ranging from 80° C. to 150° C.

8. The method according to claim 1, wherein the granular polycarbonate particles have a bulk density of 0.40 to 0.70 g/cm³ in accordance with ASTM D1895.

9. The method according to claim 1, wherein the granular polycarbonate particles have an average particle size of 0.3 to 10 mm.

10. The method according to claim 1, wherein, upon heating the mixed solution, the organic solvent contained in the polycarbonate polymerization reaction solution was removed in an amount of 80 to 90% by weight based on the initial weight of the polycarbonate reaction polymerization solution.

11. The method according to claim 1, wherein a standard deviation of the particle size of the granular polycarbonate particles is 0.26 mm or less.

* * * * *